United States Patent [19]

Balaban et al.

[11] Patent Number: 4,514,760
[45] Date of Patent: Apr. 30, 1985

[54] DIGITAL TELEVISION RECEIVER WITH TIME-MULTIPLEXED ANALOG-TO-DIGITAL CONVERTER

[75] Inventors: Alvin R. Balaban, Lebanon; Steven A. Steckler, Clark, both of N.J.

[73] Assignee: RCA Corporation, Princeton, N.J.

[21] Appl. No.: 467,284

[22] Filed: Feb. 17, 1983

[51] Int. Cl.³ .................... H04N 7/04; H04N 5/60
[52] U.S. Cl. .................... 358/143; 358/198
[58] Field of Search .................... 358/11, 14, 15, 141, 358/143, 145, 188, 198, 341, 343; 370/77, 112

[56] References Cited

U.S. PATENT DOCUMENTS

| | | | |
|---|---|---|---|
| 3,407,266 | 10/1968 | Araki et al. | 178/6.6 |
| 3,894,177 | 7/1975 | Howell et al. | 358/143 |
| 4,027,333 | 5/1977 | Kaiser et al. | 358/146 |
| 4,050,062 | 9/1977 | Crocker et al. | 370/77 |
| 4,139,868 | 2/1979 | Eisenberg et al. | 360/33 |
| 4,159,480 | 6/1979 | Tachi | 358/8 |
| 4,163,248 | 7/1979 | Heitmann | 358/12 |
| 4,191,969 | 3/1980 | Briand et al. | 358/145 |
| 4,205,343 | 5/1980 | Barrett | 358/147 |
| 4,224,642 | 9/1980 | Mawatari et al. | 360/32 |
| 4,233,627 | 11/1980 | Sugihara | 358/143 |
| 4,277,807 | 7/1981 | Baldwin | 360/32 |
| 4,300,161 | 11/1981 | Haskell | 358/142 |
| 4,335,393 | 6/1982 | Pearson | 358/4 |
| 4,364,080 | 12/1982 | Vidovic | 358/10 |
| 4,442,461 | 4/1984 | Shirai et al. | 358/343 |

OTHER PUBLICATIONS

D. Jones, "CMOS Analog Multiplexers and Switches; Applications Considerations", Application Note 520, *Linear & Data Acquisition Products*, Harris Semiconductor, 1977, pp. 7-81 to 7-89.

B. Grob, *Basic Television, Principles and Servicing*, Second Edition, McGraw-Hill Book Co., 1954, Chapter 8, pp. 129-135.

*Primary Examiner*—Tommy P. Chin
*Assistant Examiner*—Michael D. Parker
*Attorney, Agent, or Firm*—E. M. Whitacre; P. J. Rasmussen; E. P. Herrmann

[57] ABSTRACT

In a television (TV) receiver having digital signal processing in which the video and sound signals are separated in the analog processing circuitry, one analog-to-digital converter (ADC) serves both the video and sound signal paths. The analog video and sound signals are multiplexed into the ADC and are demultiplexed out of the ADC to the digital video processor and to the digital sound processor at predetermined times during each horizontal TV line. In one arrangement, the sound signal conversions are periodically interleaved with the video signal conversions during the horizontal lines. In another arrangement, the sound signal is sampled and stored at normal rate over a horizontal TV line, then converted by the ADC and digitally stored at a higher-than-normal rate during the horizontal blanking interval, and then supplied to the digital sound processor periodically at the normal rate.

22 Claims, 8 Drawing Figures

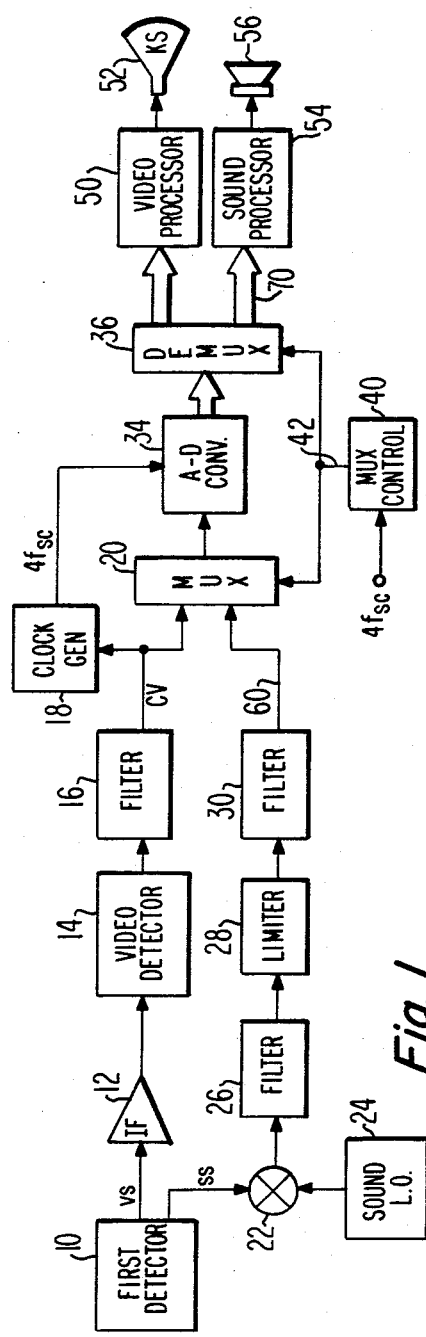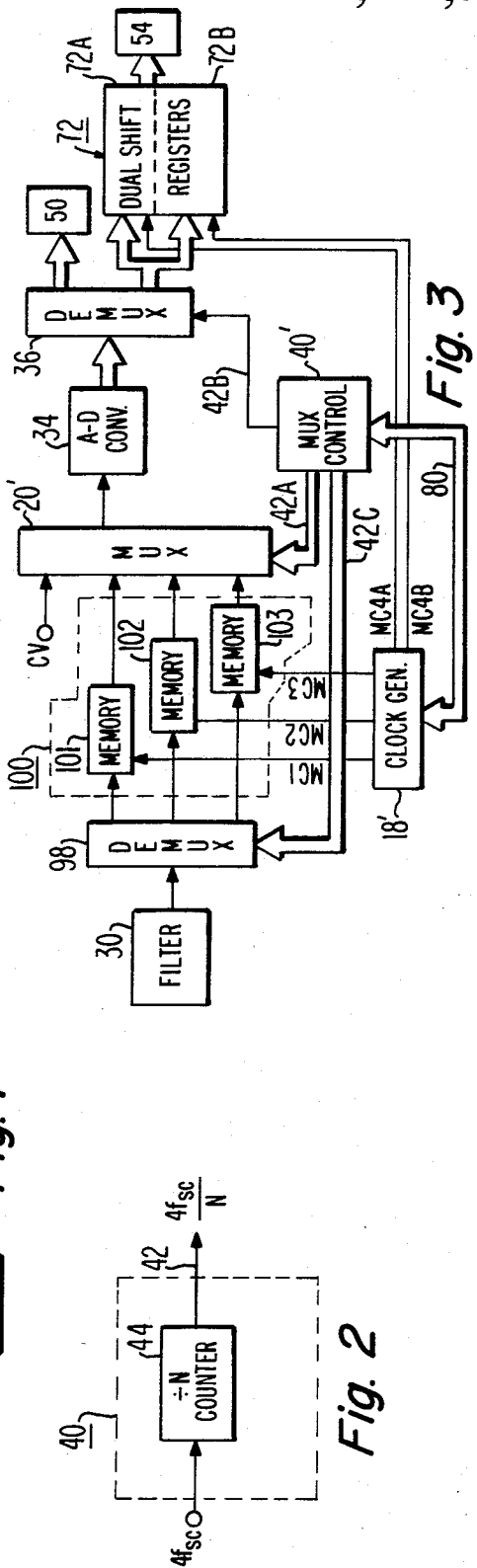

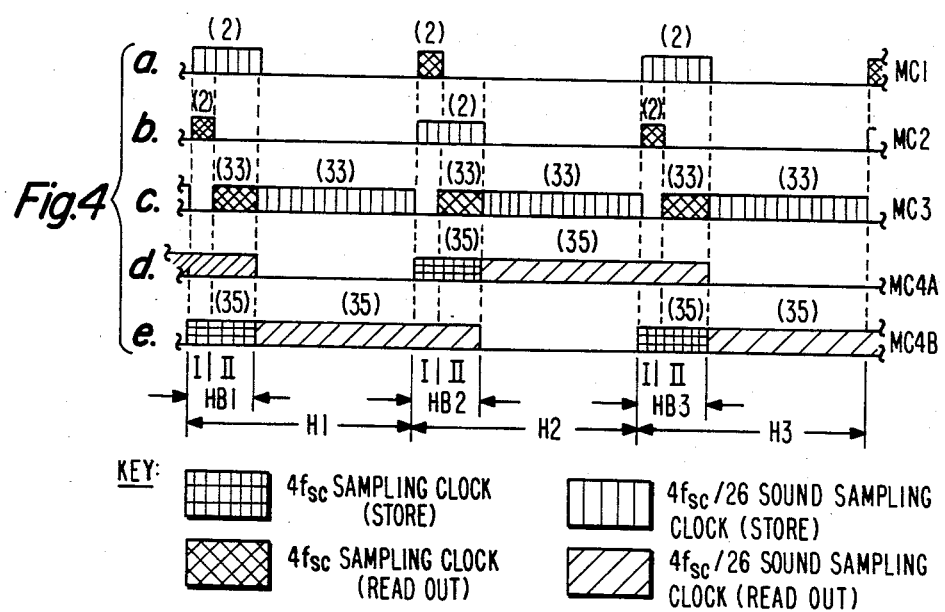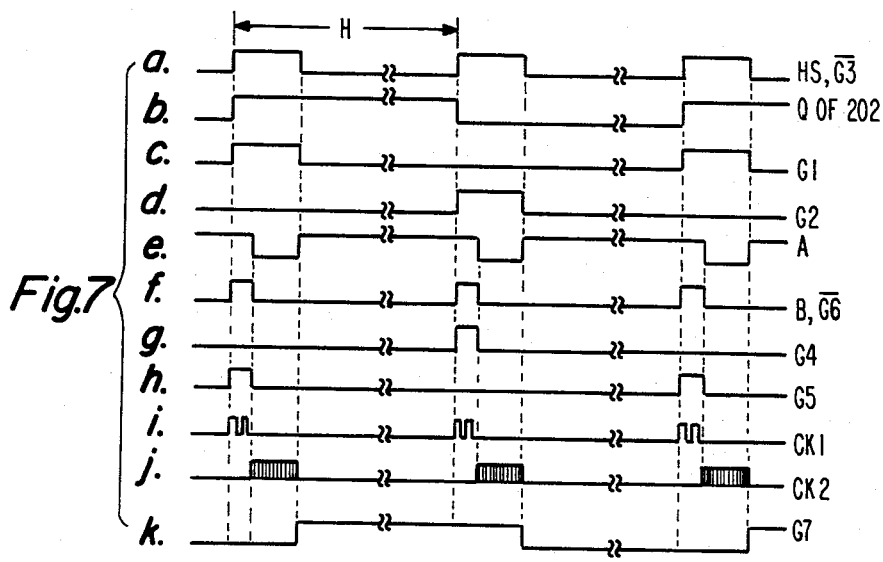

DIGITAL TELEVISION RECEIVER WITH TIME-MULTIPLEXED ANALOG-TO-DIGITAL CONVERTER

The present invention relates generally to television receivers having digital signal processing, and, in particular, to arrangements of analog-to-digital converters therefor.

Digital signal processing is being applied to television (TV) receivers wherein the video signals are converted from analog signals to digital samples by an analog-to-digital converter (ADC). It is desirable to also apply digital signal processing to the sound portions of the TV signal.

For the NTSC system used in The United States, the video bandwidth is about 4.2 MegaHertz (MHz) so that the minimum sampling rate required is 8.4 MHz according to the Nyquist sampling criteria. This rate provides about 534 samples per horizontal TV line. It is convenient to establish the sampling signal at a multiple of the color subcarrier signal frequency $f_{sc}$ which is about 3.58 MHz in the NTSC system. In particular, four times that frequency (i.e., $4f_{sc} = 14.32$ MHz) is most convenient in that it both satisfies the Nyquist sampling criteria and facilitates demodulation of quadrature components of the chrominance signals. This sampling rate provides about 910 samples per horizontal TV line, i.e., about 376 more than the minimum number necessary to represent the video signals.

It is herein recognized that because ADCs which can operate at the $4f_{sc}$ sampling rate are both expensive and consume significant amounts of power, it is advantageous that the 376 unneeded samples, or at least a portion thereof, be used other than to supply redundant video information. To that end, the present invention comprises sources of video and sound signals, an analog-to-digital converter, and digital video and sound signal processors. The analog-to-digital converter couples sound signals to the digital sound signal processor at selected times and video signals to the digital video signal processor at other times.

In the DRAWING:

FIG. 1 is a block diagram of a TV receiver including an embodiment of the present invention;

FIG. 2 is a schematic diagram of particular apparatus useful with the embodiment of FIG. 1;

FIG. 3 is a schematic diagram, in block diagram form, of a modification useful in the apparatus of FIG. 1;

FIGS. 4 and 7 illustrate waveforms useful in understanding the operation of the apparatus of FIG. 3 and 5-6, respectively;

Figure 5:
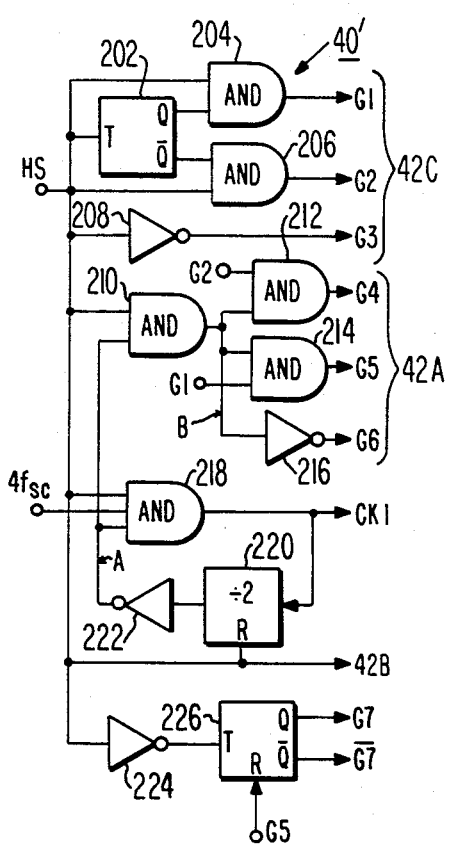
FIGS. 5 and 6 are schematic diagrams of particular apparatus useful with the apparatus of FIG. 3.

In the drawing, single line arrows represent analog signal or single-bit digital signal connections whereas broad arrows represent plural-bit parallel-format digital signal connections. Unless otherwise stated, digital samples are eight-bit parallel signals.

In the TV receiver of FIG. 1, television signals from a tuning system (not shown) are applied to first detector 10 which produces therefrom an intermediate frequency (IF) video signal VS comprising an amplitude-modulated picture carrier at about 45.75 MHz and an IF sound signal SS comprising a frequency modulated sound carrier at about 41.25 MHz, i.e., in the NTSC system. Video signals VS and sound signals SS are separated from the composite IF signals produced by the tuning system by two respective filters in detector 10. Video signal VS is amplified and bandpass filtered by IF amplifier 12 which can include automatic gain control (AGC) to adjust the amplitude of its output signal to a predetermined level. Video detector 14, which may simply comprise a peak detector, demodulates the IF picture carrier signal to produce an analog baseband composite video signal which is band limited to about 4.2 MHz by filter 16 to preclude the generation of aliasing signals by the subsequent analog-to-digital conversion process.

Composite video signal CV is applied to clock generator 18 which includes a gated phase locked loop which generates the sampling clock signal $4f_{sc}$. The sampling clock signal $4f_{sc}$ is at four times the frequency, $f_{sc}$, of the color subcarrier signal and is phase locked to the color reference burst signal portion of the composite video signal CV. Clock generator 18 also includes conventional circuitry for developing synchronizing signals.

Sound signal SS from detector 10 is, for example, heterodyned in mixer 22 with the frequency signal provided by sound local oscillator 24 to translate the sound carrier signal applied to filter 26 to a lower frequency. For example, when the frequency of the sound local oscillator 24 is 41.1 MHz, the 41.25 MHz sound IF carrier is translated to 0.15 MHz. Bandpass filter 26 limits the bandwidth of the analog sound signals to about ±110 KiloHertz (KHz) with respect to the 150 KHz (0.15 MHz) sound carrier. Since the sound signal is frequency modulated, its amplitude is limited by limiter 28. Filter 30 then removes unwanted signals generated by the limiting process and also limits the upper frequency of the sound signal to 260 KHz to preclude the generation of aliasing signals by the subsequent analog-to-digital conversion process. Alternatively, sound signal SS could be shifted in frequency and demodulated by a conventional intercarrier sound arrangement.

Multiplexer (MUX) 20 receives analog baseband composite video signals CV from filter 16 and analog sound signals from filter 30. MUX 20 applies one of those analog signals to eight-bit analog-to-digital converter (ADC) 34 in accordance with a selection control signal supplied via line 42 from MUX control 40, which is described in detail below. ADC 34 produces eight-bit digital words (samples) at the sampling clock rate $4f_{sc}$ having values corresponding to the levels of analog signals supplied from MUX 20.

Demultiplexer (DEMUX) 36 couples digital samples from ADC 34 to one of digital video signal processor 50 and digital sound signal processor 54 in accordance with the selection control signal supplied via line 42 from MUX control 40. Thus, MUX 20 and DEMUX 36 cooperate to couple ADC 34 into a selected one of the video signal path or the sound signal path at given times. In this manner, analog video signals CV are coupled at selected times via ADC 34 to digital video processor 50 which develops the picture signals necessary to develop a picture display on kinescope 52. In similar manner, analog sound signals are coupled at other selected times via ADC 34 to digital sound processor 54 which develops the audio signals necessary to produce the sound program on loudspeaker 56.

At least thirty-three samples per horizontal TV line are required to satisfy the Nyquist sampling criteria for an analog sound signal which is band limited to 260 KHz as described above. Thus, MUX 20 and DEMUX 36 must couple ADC 34 into the sound signal path for at least thirty-three sound samples, i.e., thirty-three cycles of sampling clock signal $4f_{sc}$, during each horizontal TV line.

The arrangement of FIG. 2 inserts the sound samples periodically into the stream of analog samples applied to ADC 34 in place of video samples, i.e., at evenly spaced times essentially contemporaneously with their occurrences. MUX control 40 develops the control signal on line 42 to periodically insert one sound sample into the stream of conversions done by ADC 34. Counter 44 divides the sampling clock signal $4f_{sc}$ by an integer number N which is in a range between three and twenty-seven (i.e., $3 \leq N \leq 27$). The range of acceptable values of N is selected such that at least thirty-three sound samples and at least 534 video samples are provided during each horizontal TV line, thereby satisfying the Nyquist sampling requirement.

With N=26, for example, counter 44 produces on every twenty-sixth cycle of sampling clock $4f_{sc}$ a logically high level selection signal on line 42 which controls MUX 20 and DEMUX 36 to couple ADC 34 to pass the sound signals. On the next subsequent cycle of sampling clock $4f_{sc}$, the selection signal outputs at line 42 return to low levels restoring MUX 20, ADC 34 and DEMUX 36 to again pass the video signals. This arrangement provides 35 sound conversion samples per horizontal TV line.

It is noted that a latch arrangement responsive to the MUX control signal is included in either DEMUX 36 or video processor 50 to latch the last prior digital video sample during the time when DEMUX 36 is passing digital sound samples from ADC 34 to digital sound processor 54. Further, a second latch arrangement is included in either DEMUX 36 or sound processor 54 to hold the last prior digital sound sample when DEMUX 36 is passing digital video samples from ADC 34 to digital video processor 50.

The arrangement of FIGS. 1 and 2 is advantageously simple, however, it does cause the loss of a small number of video samples during the picture information portion of video signal CV, i.e., those video samples replaced by sound samples. The arrangement of FIG. 3 employs a time-compression and time-expansion technique wherein analog sound samples are stored as they occur, are thereafter rapidly converted into digital samples and stored, and the digital sound samples are then read out of storage at substantially the same rate at which they occurred. In particular, the sound samples are applied to ADC 34 instead of video samples during a portion of the horizontal blanking interval (retrace) portion of video signal CV so that no picture information video samples are lost, i.e., no video samples are replaced by sound samples as is the case in the embodiment of FIGS. 1 and 2.

FIG. 3 shows a modification to the system of FIG. 1 including an arrangement wherein ADC 34 converts thirty-five sound samples as a group at a rapid rate during a predetermined portion of each horizontal TV line rather than periodically throughout the horizontal line as described above. This is done, for example, during the horizontal blanking interval (retrace) of each TV line.

Thirty-five samples of analog sound signals from filter 30 via demultiplexer 98 are stored in analog memory 100 during each horizontal TV line substantially as they occur. These stored samples are applied by multiplexer 20' to ADC 34 at a much higher rate during the horizontal synchronization pulse interval of the next TV line. The digital samples thus developed are applied via demultiplexer 36 to a digital memory 72 at the higher rate. The stored digital samples are subsequently read out of digital memory 72 and applied to digital sound processor 54 at substantially the rate at which they had originally occurred as corresponding analog sound signal samples during the same line in which they are produced by ADC 34 (i.e., the line after they are stored in analog memory 100). During the portion of each horizontal TV line other than the horizontal synchronization pulse interval, MUX 20', ADC 34 and DEMUX 36 apply digital video samples corresponding to analog video signal CV to digital video processor 50 substantially as described above in relation to FIG. 1. The above operations are performed in response to timing signals developed by clock generator 18' and gating signals developed by MUX control 40' which will be described in detail below.

Of the thirty-five sound signal samples per horizontal TV line, two of these will occur during the horizontal synchronizing pulse interval. To avoid loss of sound samples during the horizontal synchronizing pulse, analog memory 100 includes memory blocks 101 and 102 which are, for example, two-stage charge-coupled-device (CCD) analog delay lines. Memory blocks 101 and 102 are used to read and write on alternate lines so that one is supplying stored sound samples (reading out) while the other is being used to store sound samples (writing in) and vice versa. Memory block 103 is a thirty-three-stage CCD analog delay line which is read out during the horizontal synchronizing pulse interval of each TV line and stores analog sound samples during the remainder thereof. Similarly, dual shift register 72 includes two thirty-five stage shift registers 72A and 72B in parallel for alternately accepting the corresponding thirty-five digital samples at a high rate and later supplying those samples at a lower rate.

The sequence of operation of memory 100 and shift register 72 of FIG. 3 will now be set forth for a time period encompassing approximately three horizontal line durations as illustrated by FIG. 4, emphasizing the processing of the sets of sound signal samples. Clock generator 18' develops clocking signals at two rates: a video sampling clock at the relatively higher rate of $4f_{sc}$ which is four times the color subcarrier frequency $f_{sc}$ (i.e., 910 samples per line) and a sound sampling clock at the relatively lower rate of $4f_{sc}/26$ (i.e., 35 samples per TV line). The latter is developed in a manner similar to that shown in FIG. 2. Generator 18' develops memory clocking signals MC1, MC2, MC3, MC4A and MC4B shown in FIG. 4 by selecting from the $4f_{sc}$ and the $4f_{sc}/26$ clock signals at predetermined times in response to gating signals supplied via path 80 from MUX control 40'.

In the horizontal synchronization interval HB1 of a first line H1, DEMUX 98 applies the analog sound signals to memory block 101 in response to control signals from MUX control 40' via line 42C. Clock generator 18' applies clock signal MC1 shown in FIG. 4a to memory block 101. During this interval, MC1 is the $4f_{sc}/26$ sound sampling clock signal so that analog sound samples 1 and 2 are stored in CCD memory 101. It is noted that memories 102 and 103 are sequentially selected by MUX 20' and the data stored therein is read out to ADC 34 and digitally stored in shift register 72 as explained in detail below.

In the remainder of the first line H1 (i.e., the remaining portion of the horizontal blanking interval and the picture information interval), MUX control 40' via lines 42A and 42B causes analog video samples to pass via MUX 20', ADC 34 and DEMUX 36 to digital video processor 50. In addition, MUX control 40' via line 42C causes DEMUX 98 to apply analog sound signals to CCD memory 103. Clock generator 18' applies clock signal MC3 shown in FIG. 4c to CCD memory 103. During this interval, MC3 is the $4f_{sc}/26$ sound sampling clock so that analog sound samples 3-35 are stored in CCD memory 103. Clock signals MC1 and MC2 to memories 101 and 102, respectively, contain no clock pulses during this interval and so the samples stored in memories 101 and 102 are unchanged.

In the horizontal synchronization pulse interval HB2 of a second line H2 immediately after the first line H1, DEMUX 98 applies the analog sound signals to CCD memory 102 in response to control signals from MUX control 40' via line 42C. Clock generator 18' applies clock signal MC2, which is the $4f_{sc}/26$ sound sampling clock during this interval, to memory 102 so that analog sound samples 36 and 37 are stored therein.

In addition, during a first portion I of this interval HB2 of the second given TV line, MUX control 40' via line 42A causes MUX 20' to couple memory 101 to ADC 34. During this first portion I, MC1 includes two cycles of the $4f_{sc}$ sampling clock so that the samples 1 and 2 stored in memory 101 during the horizontal synchronization pulse interval of the first TV line H1 are converted to corresponding digital samples and stored in shift register 72A. Clock signal MC3 contains no clock pulses during the first portion of this interval so that the samples stored in memory 103 are unchanged. During the remaining portion II of this interval HB2, MUX control 40' causes MUX 20' to couple memory 103 to ADC 34, and clock generator 18' applies clock signal MC3 including thirty-three clock pulses of the $4f_{sc}$ sampling clock to memory 103 so that analog sound samples 3-35 stored therein are converted to corresponding digital samples and stored in shift register 72A.

Shift register 72 is a dual shift register including two thirty-five stage, eight-bit parallel shift registers 72A and 72B connected in parallel and clocked so that one is accepting (shifting-in) data while the other is supplying (shifting-out data) and vice versa. During the horizontal synchronizing pulse interval HB2 of the second line, clock MC4A shown in FIG. 4d applied to shift register 72A includes thirty-five clock pulses of the $4f_{sc}$ sampling clock signal so that samples 1-35 are shifted into and stored in shift register 72A.

In the remainder of this second line H2, analog video samples CV are again passed by MUX 20', ADC 34 and DEMUX 36 and thirty-three new sound samples 38-70 are stored in memory 103 in the manner described above. In addition, samples 1-33 are supplied from shift register 72A to digital sound processor 54 in response to clock signal MC4A which includes thirty-three clock pulses of the $4f_{sc}/26$ sound sampling signal.

In the horizontal synchronizing pulse interval HB3 of the third line H3, two additional cycles of the $4f_{sc}/26$ sound sampling signal are included in clock signal MC4A to shift samples 34 and 35 from shift register 72A to processor 54. Clocking signals MC2 and MC3 respectively cause samples 36-37 previously stored in memory 102 and samples 38-70 previously stored in memory 103 to be sequentially passed during portions I and II, respectively, of HB3 via MUX 20', ADC 34 and DEMUX 36. The digital samples 36-70 corresponding thereto are stored in shift register 72B in response to clock signal MC4B shown in FIG. 4e. Clock signal MC4B includes thirty-five clock pulses of the $4f_{sc}$ sampling signal during HB3. In addition, new sound samples 71 and 72 of the analog sound signals are acquired and stored in memory 101 in response to clock MC1 in like manner to that described for interval HB1.

In the remainder of third line H3, new analog sound samples 73-105 are acquired and stored in memory 103 in the manner described above. In addition, clock MC4B includes thirty-three cycles of the $4f_{sc}/26$ sound sampling signals to cause sound samples 36-68 to be read out of shift register 72B and into sound processor 54 in like manner to that described above for the read out of shift register 72A during line H2.

Thus, memories 101 and 103 for one line alternate with memories 102 and 103 for the next line to store periodic analog sound samples substantially as they occur and to read out those samples at the higher $4f_{sc}$ rate. Similarly, dual shift registers 72A and 72B alternate to store at the higher $4f_{sc}$ rate digital samples corresponding to those analog sound samples and to read out those digital samples at substantially the rate at which they occurred, but delayed by the duration H of one horizontal line plus a synchronization pulse interval HB.

Figure 6:
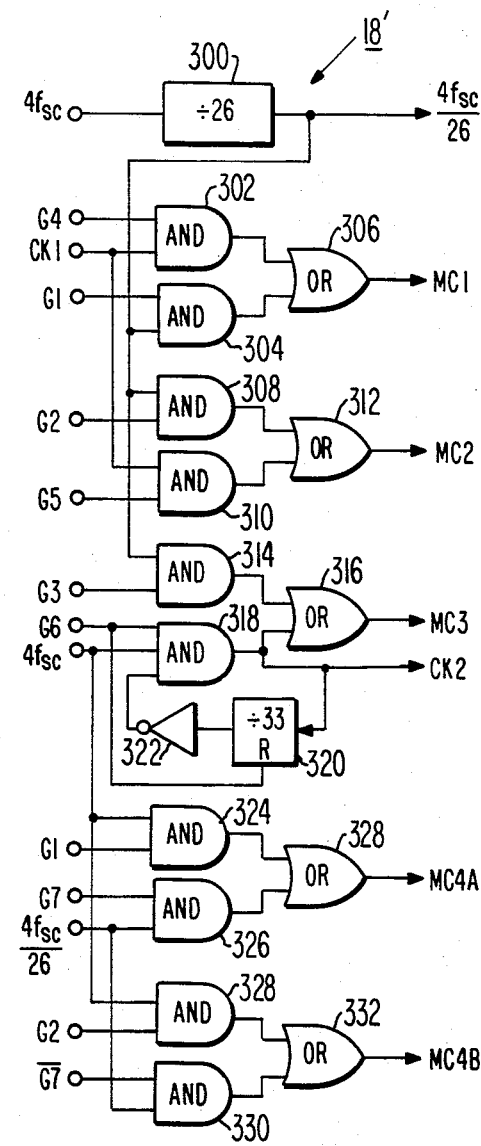

The embodiments of MUX control 40' and clock generator 18' shown in FIGS. 5 and 6 are suitable for use in the arrangement of FIG. 3 and will now be described in detail with reference to the signal waveforms shown in FIG. 7. MUX control 40' receives horizontal synchronizing pulse HS (FIG. 7a) and sampling clock $4f_{sc}$ which are developed in response to the synchronization pulse and color reference burst components of the video signal in conventional fashion. Flip-flop 202 toggles T in response to positive-going transitions of HS to develop at its output Q a signal (FIG. 7b) defining alternate TV lines H. AND gates 204 and 206 develop gating signals G1 and G2 (FIGS. 7c and 7d) from signals HS and the complementary outputs from flip-flop 202. Inverter 208 develops gating signal G3 from signal HS. Signals G1, G2 and G3 are appied to DEMUX 98 of FIG. 3 via a parallel digital bus 42C.

AND gate 210 develops gating signal B (FIG. 7f) from signals HS and A (FIG. 7e) the generation of signal A being described below. AND gate 212 develops gating signal G4 (FIG. 7g) from signals G2 and B, and AND gate 214 develops gating signal G5 (FIG. 7h) from signals G1 and B. Inverter 216 develops gating signal G6 from signal B. Signals G4, G5 and G6 are applied to MUX 20' of FIG. 3 via a parallel digital bus 42A.

Divide-by-two circuit 220 is reset by the negative-going transition of signal HS to cause inverter 222 to apply a high-logic level to AND gates 210 and 218. Then, the next high-logic level transition of HS enables AND gate 218 to pass sampling signal $4f_{sc}$ to develop gated-clocking signal CK1. This enabled condition continues until two clock pulses of the $4f_{sc}/26$ signal occur on the CK1 signal at which time divide-by-two circuit 220 causes inverter 222 to apply a low-logic level to disable AND gate 218. Thus, gated-clocking signal CK1 having the waveform shown in FIG. 4i is developed.

Signal HS is further applied to DEMUX 36 of FIG. 3 as a gating signal via digital bus 42B. Flip-flop 226 toggles T in response to positive-going transitions of the signal from inverter 224 which is $\overline{HS}$. Flip-flop 226 develops complementary gating signals G7 (FIG. 7k) and $\overline{G7}$ at its respective Q and $\overline{Q}$ outputs. Signals G7 and $\overline{G7}$ represent alternate TV lines H but are delayed by the duration of the high-logic level of signal HS with respect to the signal at the Q output of flip-flop 202. So that flip-flops 202 and 226 are properly synchronized, flip-flop 226 is reset R by the negative-going portion of gating signal G5.

It is noted that signals G1, G2, G3, G4, G5, G6, G7, $\overline{G7}$ and CK1 are applied from MUX control 40' to clock generator 18' via parallel digital bus 80.

Clock generator 18' of FIG. 6 includes a divide-by-twenty-six circuit 300 to develop the $4f_{sc}/26$ sound sampling signal from the $4f_{sc}$ sampling signal. AND gate 302 combines gating signal G4 and gated clock signal CK1. AND gate 304 combines gating signal G1 and the $4f_{sc}/26$ sampling signal. OR gate 306 combines the outputs from AND gates 302 and 304 to develop memory clock signal MC1 (FIG. 4a). In similar manner, AND gates 308 and 310 and OR gate 312 combine gating signals G2 and G5 and signals CK1 and $4f_{sc}/26$ to develop clocking signal MC2 (FIG. 4b).

AND gate 314 combines gating signal G3 and sampling signal $4f_{sc}/26$ to cause OR gate 316 to develop a portion of memory clock signal MC3. Divide-by-two circuit 320 is reset by the negative-going transition of gating signal G6 to cause inverter 322 to apply a high-logic level to AND gate 318. Then the next high-logic level transition of G6 enables AND gate 318 to pass sampling signal $4f_{sc}$ to develop gated-clocking signal CK2. This enabled condition continues until thirty-three clock pulses of the $4f_{sc}$ signal occur on the CK2 signal at which time divide-by-thirty-three circuit 320 causes inverter 322 to apply a low-logic level to disable AND gate 318. Thus, gated-clocking signal CK2 having the waveform shown in FIG. 7j is developed. OR gate 316 combines CK2 with the output from AND gate 314 to develop memory clocking signal MC3 (FIG. 4d).

Sampling signals $4f_{sc}$ and $4f_{sc}/26$ are combined with gating signals G1 and G7 by AND gates 324 and 326 and OR gate 328 to develop shift register clocking signal MC4A (FIG. 4d). Similarly, sampling signals $4f_{sc}$ and $4f_{sc}/26$ are combined with gating signals G2 and $\overline{G7}$ by AND gates 328 and 330 and OR gate 332 to develop shift register clocking signal MC4B (FIG. 4e).

It is noted that signals $4f_{sc}$ and HS are applied from clock generator 18' to MUX control 40' via parallel digital bus 80.

Modifications are contemplated to the present invention which is limited only by the claims following. For example, more than the minimum number thirty-three of sound samples can be utilized. If four times that number (i.e., 132 samples) are used, the over-sampling information can be used by digital sound signal processor 54 to calculate an additional bit of resolution. Practically, however, unless a higher frequency sampling clock is employed, the number of sound samples stored is limited to about 143 because the clock signal $4f_{sc}$ has only about 143 cycles during the approximately ten microsecond duration of the horizontal blanking interval.

Figure 8:
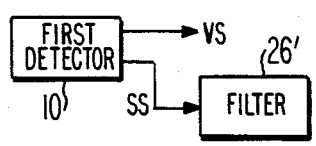
FIG. 8 is a modification useful with the apparatus of FIGS. 1 and 3.

It is not necessary that mixer 22 be used to shift the sound IF signal 22 to a lower frequency. FIG. 8 shows a modification in which mixer 22 is eliminated and sound signal SS at the IF frequency from detector 10 is filtered by bandpass filter 26' and applied via limiter 28 and filter 30 to ADC 34. ADC 34 operates at the $4f_{sc}$ sampling rate to develop digital samples corresponding to the IF sound signal. The ADC will then directly demodulate the sound signal as described in U.S. patent application Ser. No. 351,307, entitled DIGITAL TELEVISION RECEIVERS which is assigned to the same assignee as is the present invention and is incorporated herein by reference. It is noted that the $4f_{sc}$ sampling rate satisfies the Nyquist criteria with respect to the band width of the information bearing sidebands about the IF carrier frequency.

Analog storage devices other than the CCD delay lines 101, 102 and 103 described herein could be employed, for example, a plurality of capacitive sample-and-hold arrangements or bucket brigade devices are satisfactory.

What is claimed is:

1. In a television receiver, apparatus comprising:
   a source of analog video signals having a periodic line repetition rate and a period corresponding thereto;
   an analog-to-digital converter for developing a plurality of digital samples from analog signals during said line repetition period;
   a digital video processor for processing digital video samples;
   coupling means responsive to a component of said analog video signals for selectively coupling said analog-to-digital converter between said source of analog video signals and said digital video processor at first times, said first times including a portion of said line repetition period sufficient for said analog-to-digital converter to develop digital video samples to satisfy the Nyquist sampling rate criteria for said analog video signals;
   a source of analog sound samples;
   a digital sound processor for processing digital sound samples; and
   means included in said coupling means for selectively coupling said analog-to-digital converter between said source of analog sound signals and said digital sound processor at second times different from said first times, said second times including a portion of said line repetition period sufficient for said analog-to-digital converter to develop digital sound samples to satisfy the Nyquist sampling rate criteria for said analog sound signals.

2. The apparatus of claim 1 wherein said coupling means makes said second times occur at a periodic rate substantially greater than said line repetition rate, whereby said digital sound samples corresponding to said analog sound samples are applied to said digital sound processor at a plurality of times during said line repetition period of said analog video signals.

3. The apparatus of claim 2 wherein said coupling means further includes clocking means for developing a clocking signal at a multiple of a reference frequency component included in said analog video signals, and means responsive to said clocking signal for determining the periodic rate of occurrences of said second times.

4. The apparatus of claim 1 wherein said means for coupling includes means for making said second times occur at substantially said line repetition rate.

5. The apparatus of claim 4 further including means for storing samples of said analog sound signals during said first times and for applying said stored analog sound samples to said analog-to-digital converter during said second times.

6. The apparatus of claim 5 wherein said means for storing samples includes means for providing clocking signals at first and second frequencies for said storing and said applying of said analog sound samples, said first frequency being selected to produce a given number of clock pulses of said clocking signals during said first time and said second frequency being selected to produce substantially said given number of clock pulses of said clocking signals during said second time.

7. The apparatus of claim 6 wherein said means for storing samples further includes second means for storing said analog sound samples in response to said clocking signal at said first frequency during one of said second times and for applying said samples so stored in said second means to said analog-to-digital converter in response to said clocking signals at said second frequency during the next subsequent one of said second times.

8. The apparatus of claim 6 further including:
means for storing the digital samples from said analog-to-digital converter in response to said clocking signals at said second frequency during said second times and for applying said stored digital samples to said digital sound processor in response to said clocking signals at said first frequency during said first times.

9. The apparatus of claim 1 wherein said coupling means includes clock generating means responsive to a reference frequency signal component included in said analog video signals for generating a clocking signal at an integral multiple of the frequency of said reference frequency signal component, and means responsive to said clocking signal for determining said first and second times.

10. The apparatus of claim 9 wherein said clocking signal is applied to said analog-to-digital converter to control the conversion rate thereof.

11. In a television receiver including a source of analog video signals having a periodic line repetition rate and a period corresponding thereto, a source of analog sound signals, a digital video signal processor and a digital sound signal processor, apparatus comprising:
multiplexing means having inputs for receiving said analog video signals and said analog sound signals, respectively, said multiplexing means being responsive to a control signal for providing at an output thereof a selected one of said analog video signals and said analog sound signals;
an analog-to-digital converter having an input for receiving said selected one of said analog video signals and said analog sound signals, and having an output at which digital samples corresponding thereto are developed;
demultiplexing means having outputs coupled to said digital video signal processor and to said digital sound signal processor, respectively, said demultiplexing means being responsive to said control signal for coupling the digital samples supplied to an input thereof from the output of said analog-to-digital converter to a selected one of its outputs; and
control means for developing said control signal at a periodic rate no less than said line repetition rate of said analog video signals to apply the digital samples corresponding to said analog video signals to said digital video signal processor substantially as they are developed during said line repetition period and to apply digital samples corresponding to said analog sound signals to said digital sound signal processor during said line repetition period.

12. The apparatus of claim 11 wherein said periodic rate is substantially greater than said line repetition rate, whereby said digital samples corresponding to said analog sound signals are applied to said digital sound signal processor at a plurality of times during said line repetition period of said analog video signals.

13. The apparatus of claim 11 wherein said analog video signals include first and second time sequential portions within said line repetition period, and said control means develops said control signal to cause said demultiplexing means to apply said digital samples to said digital video signal processor and to said digital sound signal processor substantially in time correspondence with said first and second time sequential portions, respectively.

14. The apparatus of claim 13 further comprising:
first storing means, coupled between said source of analog sound signals and said multiplexing means and responsive to clocking signals, for storing samples of said analog sound signals during said first time sequential portions, and for producing said stored analog sound samples delayed by a predetermined number of cycles of said clocking signal during said second time sequential portions;
second storing means, coupled between said demultiplexing means and said digital sound signal processor and responsive to said clocking signals, for storing said digital sound samples during said second time sequential portions, and for producing said stored digital sound samples delayed by said predetermined number of cycles during said first time sequential portions; and
timing means responsive to said control signal for supplying said clocking signals having said predetermined number of cycles during said first and second time sequential portions.

15. The apparatus of claim 13 wherein said first time sequential portions substantially correspond to picture information intervals of horizontal lines of said analog video signals, and said second time sequential portions substantially correspond to at least a portion of blanking, intervals thereof.

16. Analog-to-digital conversion apparatus for a television receiver comprising:
an analog-to-digital converter for developing digital samples corresponding to analog signals applied to an input thereof;
a multiplexer having a plurality of inputs selectively coupled to an output thereof in response to a control signal;
a source of analog signals related in time to first and second alternating time sequential portions of a television signal;
an analog memory having an input coupled to said source for receiving said analog signals from said source, and having a plurality of memory blocks each having a respective output coupled to one of the inputs of said multiplexer, said memory blocks being responsive to clocking signals for storing samples of said analog signals and for producing said stored samples;
clocking means for generating said clocking signals including a first clocking signal for making a first of said memory blocks to store said samples of said analog signals during each of said first time sequential portions and to produce said stored samples during each of said second time sequential portions, and a second clocking signal for making a second of said memory blocks to store said samples of said analog signals during even numbered ones of said second time sequential portions and to produce said stored samples during odd numbered ones of said second time sequential portions; and control means for generating said control signal so that said multiplexer selectively couples said memory block producing said stored analog samples to said analog-to-digital converter at times when said stored samples are produced during each of said second time sequential portions.

17. The apparatus of claim 16 further comprising:

a demultiplexer having an input to which the digital samples developed by said analog-to-digital converter are applied and having a plurality of outputs to which the input thereof is selectively coupled in response to a demultiplexing signal;

a digital memory to which the output of said demultiplexer is coupled for storing digital samples selectively coupled thereto by said demultiplexer; wherein said control means further generates said demultiplexing signal so that said demultiplexer selectively couples said analog-to-digital converter to said digital memory during each of said second time sequential portions; and said clocking means generates a third clocking signal applied to said digital memory for storing said digital samples coupled thereto.

18. The apparatus of claim 17 wherein said digital memory includes first and second storage registers, and said third clocking signal is applied for storing said digital samples in said first and second storage registers in said even numbered and said odd numbered ones, respectively, of said second time sequential portions.

19. The apparatus of claim 16 further comprising:

a demultiplexer coupled between said source and said analog memory having an input to which said analog signals are applied and having a plurality of outputs coupled to respective ones of said plurality of memory blocks; and wherein said control means generates a further control signal applied to said demultiplexer for selectively coupling said analog signals to said first memory block during said first time sequential portions and to said second memory block during said even numbered ones of said second time sequential portions.

20. Apparatus comprising:

a source of analog video signals including successive horizontal line intervals with respective picture and blanking intervals;

a source of analog sound signals;

an analog-to-digital converter for converting an analog signal to digital samples representing said analog signal;

digital video processing means for processing digital samples representing said analog video signal;

means for selectively coupling said analog-to-digital converter between said source of analog video signals and said digital video processing means during a first predetermined portion of said horizontal line intervals and between said source of analog sound signals and digital sound signal processing means during a second predetermined portion of said horizontal line intervals different from said first predetermined portion.

21. The apparatus recited in claim 20 wherein said first and second predetermined portions include first and second interleaved intervals periodically distributed throughout said horizontal line intervals.

22. The apparatus recited in claim 20 wherein said first predetermined portion includes said picture interval and said second predetermined portion includes at least a portion of said blanking interval.

* * * * *